Figure 1:
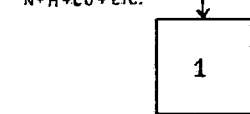
Figure 1:
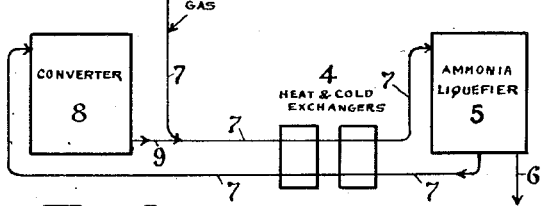

July 21, 1931.    F. W. DE JAHN    1,815,243

PROCESS OF MAKING AMMONIA BY CATALYSIS

Filed May 12, 1923

WITNESS
G. V. Rasmussen

INVENTOR
FREDRIK W. DE JAHN
BY
Nielsen Ahlerich
ATTORNEYS

Patented July 21, 1931

1,815,243

UNITED STATES PATENT OFFICE

FREDRIK W. DE JAHN, OF NEW YORK, N. Y., ASSIGNOR TO ATMOSPHERIC NITROGEN CORPORATION, OF SYRACUSE, NEW YORK, A CORPORATION OF NEW YORK

PROCESS OF MAKING AMMONIA BY CATALYSIS

Application filed May 12, 1923. Serial No. 638,451.

This invention relates to the synthetic production of ammonia from nitrogen and hydrogen gases and particularly to that type of process which is known as the de Jahn process. The general process consists of making a crude gas mixture containing hydrogen and carbon monoxide and nitrogen, the relation between said three constituents being so controlled that at the time when the CO is replaced by hydrogen there is one volume of nitrogen for each three volumes of hydrogen and CO taken together; then, by catalysis in the presence of steam causing substantially all the CO to be replaced by equal volumes of hydrogen, whereby the crude gas mixture of nitrogen and hydrogen in the substantial proportion of 1:3 is obtained. These gases are then subjected to pressure of about 95 atm. and while under such pressure successively freed from impurities. The purified gases, still under pressure, are then passed through an ammonia catalyzer and the gases from said catalyzer are passed through an ammonia liquefier, the residual gases from said liquefier being returned to the stream of fresh gases entering the ammonia catalyzer.

It has heretofore been recognized that certain impurities in the gas mixture to be catalized seemingly operate destructively upon catalytic efficiency and many remedies have been proposed. It will be readily understood that in a process of this character an absolute or scientifically perfect purity of the nitro-hydrogen gas entering the catalyzer could at best, if at all, be achieved by an unreasonable muntiplication of refining steps. It follows that, considered from a practical standpoint, the gases which are introduced to the ammonia catalyst are only of substantial but not of perfect purity. Traces of water impurities and carbon compound, for example, persist in the gas mixture. But it is the presence of these "traces" of impurities which determines the operative efficiency of the ammonia catalyst— whether the catalyst will have a low or even non-economic efficiency and a short life or whether its efficiency will be high and remain so indefinitely. I have now discovered that by subjecting the gas immediately prior to its introduction to the ammonia catalyst to treatment with ammonia in its liquefied state (as distinguished from aqua ammonia) the results of the process at large will be greatly improved. This procedure is apparently at variance with the logical carrying out of the general process. The logical procedure indicates that the gas which comes in contact with the catalyst should contain a minimum of ammonia. By subjecting the fresh gas to treatment with ammonia prior to the catalytic stage either less ammonia would seem to be obtainable from the gas by catalysis or more refrigeration would be required to recover the same net amount. I have, however, found that by proceeding in the new way in the manner indicated, the liquid ammonia, preferably that procured from the catalyzed gases, acts as a scrubbing and purifying medium to such an extent that the necessity of any complicated or additional final purifying stages for the gas can be eliminated. Thus, for example, where it has heretofore been proposed to employ in the purification system soda lime and sodium amide (see U. S. Patent No. 1,436,949), such purifications can be eliminated and satisfactory results obtained by passing the fresh gas from the ammoniacal cuprous carbonate purification step directly into the synthesis system. Special purification by the use of metallic sodium or magnesium nitrate (U. S. Patent No. 1,053,952) or the use of catalytic material (U. S. Patent No. 1,386,760) and the apparatus necessary for any such special final purification can be entirely eliminated. By proceeding according to my new discovery, the desired liquid ammonia scrubbing medium can be produced in situ and be the ammonia product of the process. No extra apparatus for maintaining a supply of the required liquid ammonia, no special scrubbing apparatus and no extra refrigerating equipment to maintain the ammonia in a liquid condition are required. The synthetic ammonia process itself is capable of supplying all the required elements both as to process and as to apparatus.

Figure 2:
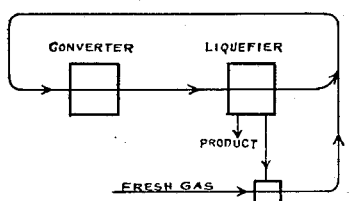
Figure 3:
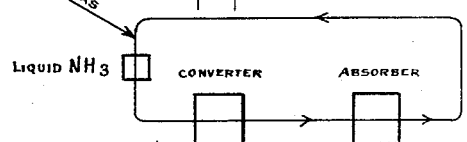
Figure 4:
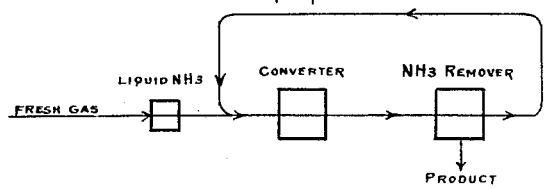
Figure 5:
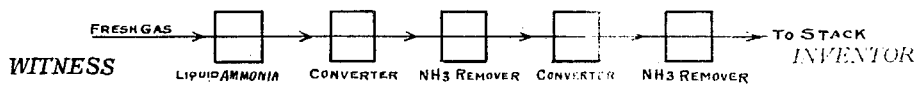

My invention is illustrated in the accompanying drawings in which Fig. 1 illustrates diagrammatically the de Jahn process considered as a whole as modified by one form of application of my new invention. Fig. 2 illustrates a further modification. In Figs. 3, 4 and 5 I have indicated possible modifications of the application of my invention with a view to illustrate the intended scope of the invention rather than to recommend that such modifications be made the basis of a practice in preference to the form shown in Figs. 1 and 2.

In the drawings, Fig. 1, the numeral 1 indicates the apparatus in which CO of the initial gases is caused to be replaced by hydrogen; 2 is the compressor whereby the gases are, in the de Jahn process, placed under approximately a 95 atm. pressure; 3 indicates the purification system; 4 indicates heat and cold exchangers; 5 an ammonia liquefier; 6 a means of withdrawing ammonia product; 7 the course of the gases to the catalyst; 8 the catalyzer and 9 the connection between the catalyzer 8 and the gases from the purification system 3. In the remaining figures of the drawings legends affixed to the drawings so clearly explain them that the use of additional numerals or of detailed description is not required. In each case, however, it will be observed that the fresh gas or the gas from the purification system passes in contact with liquid ammonia, i. e., ammonia in its liquefied state just before the fresh gases thus affected are first introduced to the converter or apparatus containing ammonia catalyst. It is important to note that in the legends applicable to Figs. 2 to 5 a distinction is made between liquefied ammonia on the one hand and an ammonia remover on the other. Where the expression "liquid ammonia" is employed reference is intended to ammonia in its liquefied state (the product obtained by liquefying ammonia gas as by subjecting ammonia gas to pressure and cooling) as distinguished from aqua ammonia, whereas where the expression "ammonia remover" is used any type of ammonia removal may be practiced, although it is preferable in each such case to remove the ammonia as liquefied ammonia rather than as aqua ammonia.

It is apparent that the invention can be applied to either or both of the gases required for ammonia synthesis or to the two gases in admixture, the latter procedure being obviously the preferred method.

Referring again to Fig. 1, the fresh gas is shown as entering the gas stream from the converter 8, and as being admixed with the gaseous ammonia contained in the converter gases in advance of the heat and cold exchangers 4. In a procedure of that type fresh gas during its passage to the catalyst is first heated and thereupon cooled in the presence of ammonia gas to a temperature at which ammonia liquefies. In the converter 8 an elevated temperature is attained which is above that required for the condensation or transformation with ammonia in the gaseous state of such carbon compound as may still be left in the fresh gas after its preliminary purification in the system 3. The gas stream leaving the converter 8 through the line 9 has an ammonia content in gaseous condition of upwards of 6%, according to the efficiency of the catalytic action and at any rate is far in excess of the amount required for reaction with the small amount of impurities in the fresh gas line at its point of entry into the gas conduit which connects the converter with the ammonia liquefier. According to my process $CO_2$ which the fresh gases may contain and which may illustratively be set down as being .001%, will be removed, any solid which deposits in the cold exchangers 4 being capable of removal from time to time as a solid as occasion may require while solids which are carried along will ultimately dissolve in or be removed with the liquefied ammonia product. Moisture impurity, and the same may be illustratively set down as approximating .007%, will be taken up by the liquefied ammonia so that such traces of these two impurities will almost certainly disappear from the gases. The present invention also serves to act as an insurance against possible failure, in the preceding purification steps, to function properly and to remove their rated proportion of moisture and carbon dioxide. The liquefied ammonia will remove moisture and carbon dioxide far in excess of the amounts above stated, so that in case of any accidental failure of the preceding purification steps included in 3, Fig. 1, this last step will automatically aid their work so far as removal of moisture and carbon dioxide is concerned.

Referring again to the three patents which have been mentioned in this specification as typifying the art and which deal with various means for the final purification of nitrogen or hydrogen or nitrogen-hydrogen gas, each of these methods has the disadvantage that the purifying agents gradually deteriorate and must be replaced from time to time. Their efficiency gradually deteriorates, so that the nitrogen-hydrogen gas is not of uniform or constant purity. In those cases where the fresh gas passes through a preliminary catalyst and then through aqua ammonia, the latter does not perform any function of removing impurities contained in the gas or gas mixture but merely extracts therefrom such ammonia as may have been formed by passage through the preliminary catalyst while added moisture due to the passage of the gas through the aqua ammonia is likely to become incorporated in the gases on their way to the real catalyst.

By my process, on the other hand, I use the liquefied ammonia as a means of dealing with impurities contained in the gases while entirely excluding a condition by which addition of moisture to the gases is possible.

While in Fig. 1 the entire liquid ammonia product of the process is shown as allowed to contact with the fresh gas stream, this is not necessary, for, as shown in Fig. 2, the fresh gas may be contacted with a portion only of the liquefied ammonia produced, while other portions of the liquefied ammonia produced are separately withdrawn without being contacted with fresh gas. Similarly, the liquefied ammonia used in Figs. 4 and 5 may be portions of the product from the respective NH₃ removers shown in said figures.

It will be noted that according to my process impurities seem to be deliberately introduced into the liquefied ammonia which, when considered, as in Figs. 1 and 2, as the final or end product of the entire de Jahn process, should logically be maintained in a condition of as near complete purity as possible. Apparently, therefore, my process departs from the very end in view. At the same time, by introducing this apparently contradictory procedure, advantages are obtained which outweigh the supposed disadvantages and the net end result is an efficiency which is not otherwise obtainable. On the other hand, in the modifications shown in Figs. 3, 4 and 5, the removed impurities do not reach the product of that particular operation. The ultimate use of the catalytically produce ammonia will be a factor in determining which of these two general classes of treatment promises the greater advantage under the circumstances prevailing.

In the use of my invention it is obvious that some forms of refrigerating or liquefying apparatus for the gas will give more intimate contact between the gas and the condensed ammonia and are therefore more efficient for the purposes of my invention. The scope of my invention, is however, not limited to any particular form of apparatus nor to any specific point of entry of the fresh gas into the synthesis system, provided that, when operating according to my invention as described, the fresh gas first passes through liquefied ammonia or preferably through part or all of the ammonia liquefaction or removal system before reaching the catalyst.

I claim:

1. In conditioning gas to render it suitable for use in catalytic ammonia synthesis that improvement which comprises bringing gas which is to participate in said synthesis into effective contact with liquefied ammonia.

2. In conditioning gas to render it suitable for use in catalytic ammonia synthesis, that improvement which comprises bringing gas which is to participate in said synthesis under a pressure substantially that under which synthesis is to be effected into effective contact with liquefied ammonia.

3. That improvement in the art of producing ammonia by the catalysis of nitrogen and hydrogen which consists in preparing gas for participation in said catalysis, bringing said gas into effective contact with ammonia in its liquefied form prior to the stage where said gas is first subjected to catalytic ammonia synthesis and then subjecting the thus treated gas to the catalytic ammonia synthesis.

4. That improvement in the art of producing ammonia by the catalysis of nitrogen and hydrogen which consists in bringing fresh gas which is to participate in said catalysis into effective contact with ammonia in its liquefied form and then subjecting the gas to catalytic ammonia synthesis.

5. The process which consists in preparing a mixture of nitrogen and hydrogen suitable for catalytic ammonia synthesis, said gases being of substantial but not perfect purity, passing said gases through ammonia in its liquefied form under pressure and then subjecting the resulting gas to catalytic ammonia synthesis.

6. In the art of producing ammonia by the catalysis of nitrogen and hydrogen that improvement which consists in bringing uncatalyzed gas intended for catalytic treatment into admixture with gas which has been in contact with an ammonia catalyst and passing the mixture through an ammonia remover and into contact with ammonia in its liquid state and then subjecting the resultant gas to catalytic ammonia synthesis.

7. The process which consists in subjecting to catalytic ammonia synthesis nitrogen and hydrogen in the relation of 1:3, passing the resultant gaseous product, containing ammonia, through a stage in which ammonia contained in said gases is removed therefrom as ammonia in its liquid state, returning the residual gases to the catalyst and during the passage of the gases from the catalyst to the ammonia collector introducing to said gases added volumes of gas consisting of nitrogen and hydrogen in the relation of 1:3, said gas still containing traces of impurities but being free from ammonia catalytically produced from said gas.

8. That improvement in the art of producing ammonia by the catalysis of nitrogen and hydrogen which consists in adding to the gases after their passage through the catalyst fresh nitrogen-hydrogen gas free from ammonia catalytically produced from said gas and then in passing the mixed gases into an ammonia liquefier, the residual gases from said liquefier being then introduced to the catalyst.

9. That improvement in the art of producing ammonia by the catalysis of nitrogen and hydrogen which consists in adding to the gases after their passage through the catalyst fresh nitrogen-hydrogen gas as yet wholly unaffected by any catalytic ammonia synthesis and free from ammonia catalytically produced from said gas and then in passing the mixed gases into an ammonia liquefier, the residual gases from said liquefier being then introduced to the catalyst.

10. The process of making ammonia by catalytic synthesis which consists in preparing a gas mixture of nitrogen and hydrogen in the general proportion of 1:3 and passing said mixture under pressure through an ammonia liquefier in the presence of gases containing synthesized gaseous ammonia before the first-named gases are first subjected to catalytic ammonia synthesis, liquefying synthesized ammonia from the gas mixture and leading the residual gases to the catalyst.

11. The process of preparing a gas mixture containing nitrogen and hydrogen in the relation of 1:3, subjecting said mixture to pressure and under said pressure removing the major part of the constituents of the gases other than nitrogen and hydrogen, and then, while the gases still contain traces of water impurities and of carbon compound, but no ammonia catalytically produced from said gases, introducing said gases into the stream of gas which has passed through an ammonia catalyst, then passing the thus compounded mixed gases through an ammonia liquefier and leading the gases from said liquefier through the catalyst to produce the stream of catalyzed gases to which additional quantities of the gas mixture first referred to are contantly introduced between the catalyist and the liquefier.

12. A process for purifying gases for use in the synthesis of ammonia which comprises, passing the gases through substantially anhydrous liquid ammonia prior to synthesizing ammonia from said gases.

13. In a process for purifying gases for use in the synthesis of ammonia the steps comprising, passing the elemental gases into contact with one or more agents for removing therefrom substances injuriously affecting an ammonia synthesis catalyst, and then bringing said gases into effective contact with substantially anhydrous liquid ammonia at a low temperature to remove traces of moisture therefrom prior to the effectuation of the synthesizing operation.

14. In a process for purifying gases for use in the catalytic synthesis of ammonia the steps comprising, compressing the gases to be catalyzed passing said gases while under pressure into contact with a purifying agent for removing therefrom substances injuriously affecting an ammonia synthesis catalyst, and passing said gases while under pressure into contact with liquid anhydrous ammonia prior to synthesizing ammonia from said gases.

15. In a process for purifying gases for use in the synthesis of ammonia the steps comprising, compressing the gases to be synthesized, forcing said gases while under pressure through a circulatory system and into contact with substantially anhydrous liquid ammonia at a low temperature to remove moisture therefrom prior to synthesizing ammonia from said gases.

16. A process of purifying gases for use in the synthesis of ammonia which comprises, passing the elemental gases under superatmospheric pressure through liquid anhydrous ammonia prior to synthesizing ammonia from said gases.

17. In the art of producing ammonia, the process which comprises continuously circulating a stream of nitrogen-hydrogen gas into contact with ammonia catalyst material, thereby subjecting the gas to catalytic ammonia synthesis, then through a stage in which ammonia contained in said gas is removed and then back to said catalyst material for further synthesis, and continuously bringing fresh or make-up gas, intended for replacement of that converted into ammonia and for maintaining the continuously circulating gas stream, into intimate contact with ammonia in its liquid form just before it comes in contact with said ammonia catalyst material.

18. In a process for purifying gases for use in the catalytic synthesis of ammonia, the steps comprising, compressing the gases to be catalyzed, and passing the gases while under superatmospheric pressure into contact with liquid anhydrous ammonia in the synthesizing system to remove final traces of moisture from the gases before effecting the catalysis of the gases to form ammonia.

19. A process for purifying gases for use in the synthesis of ammonia which comprises passing the elemental gases into contact with liquid anhydrous ammonia at refrigerating temperatures appropriate to the maintenance of the ammonia as liquid ammonia to remove moisture from the gases prior to synthesizing ammonia from said gases.

20. In a process for purifying gases for use in the catalytic synthesis of ammonia, the steps comprising, compressing the gases to be catalyzed, and passing the said gases under pressure into contact with liquid anhydrous ammonia at a refrigerating temperature appropriate according to the pressure employed to the maintenance of the ammonia as liquid ammonia to remove moisture from the gases prior to synthesizing ammonia from said gases.

21. That improvement in the art of producing ammonia by the catalysis of nitrogen and hydrogen which comprises treating at an elevated temperature gas which is to participate in said catalysis with gaseous ammonia in excess of the amount required to react with impurities present in said gas, and subsequently subjecting said gas to a purification treatment with liquid ammonia.

22. That improvement in the art of producing ammonia by the catalysis of nitrogen and hydrogen which comprises subjecting a gas containing nitrogen and hydrogen to catalytic ammonia synthesis at an elevated temperature, introducing into the resulting gas while still at an elevated temperature fresh gas which is to participate in said catalysis, said fresh gas containing carbon compound, cooling the mixture of gases to a temperature at which ammonia contained therein liquefies, and passing the residual gases to said catalytic ammonia synthesis.

23. That improvement in the art of producing ammonia by the catalysis of nitrogen and hydrogen which consists in subjecting a gas containing nitrogen and hydrogen to catalytic ammonia synthesis, liquefying ammonia thus produced, bringing fresh gas which is to participate in said catalysis into effective contact with a portion of the liquefied ammonia, and separately withdrawing another portion of said liquefied ammonia without contacting it with said fresh gas.

24. In the art of producing ammonia by subjecting a nitrogen-hydrogen gas to catalytic ammonia synthesis in a converter system, removing ammonia from the result by passing the effluent of the converter system through an ammonia liquefaction system and subjecting the unconverted nitrogen-hydrogen gaseous residue to catalytic ammonia synthesis, that improvement which comprises passing fresh gas intended for catalysis through part of the said ammonia liquefaction system in contact with the liquid ammonia therein.

25. That improvement in the art of producing ammonia by the catalysis of nitrogen and hydrogen which comprises subjecting a gas containing nitrogen and hydrogen to catalytic ammonia synthesis, removing from the catalyzed gas ammonia thus produced, circulating the remaining nitrogen and hydrogen to renewed catalytic ammonia synthesis and prior thereto admixing therewith fresh gas which is to participate in said catalysis and contacting the mixture of gases with ammonia in its liquid form.

26. In conditioning gas to render it suitable for use in catalytic ammonia synthesis, that improvement which comprises bringing a gas which is to participate in said synthesis into contact with ammonia gas and cooling said mixture to a temperature at which ammonia liquefies therefrom.

In testimony whereof I have hereunto set my hand.

FREDRIK W. DE JAHN.

CERTIFICATE OF CORRECTION.

Patent No. 1,815,243.             Granted July 21, 1931, to

FREDRIK W. de JAHN.

It is hereby certified that error appears in the printed specification of the above numbered patent requiring correction as follows: Page 1, line 35, for the compound word "nitro-hydrogen" read nitrogen-hydrogen; line 37, for the misspelled word "muntiplication" read multiplication; line 84, for "nitrate" read nitride; page 2, line 32, for "in" read into; page 3, line 39, for "produce" read produced; page 4, line 75, claim 15, before "synthesis" insert catalytic, and line 77, for "synthesized" read catalyzed; and that the said Letters Patent should be read with these corrections therein that the same may conform to the record of the case in the Patent Office.

Signed and sealed this 22nd day of September, A. D. 1931.

(Seal)

M. J. Moore,
Acting Commissioner of Patents.